US006661333B1

(12) United States Patent
Monnier

(10) Patent No.: US 6,661,333 B1
(45) Date of Patent: Dec. 9, 2003

(54) DEVICE FOR CONTROLLING A LOCKING SYSTEM FITTED WITH A CLOCK AND METHOD FOR PERFORMING AN AUDIT OF SUCH A LOCKING SYSTEM

(75) Inventor: Jean-Luc Monnier, La Chaux-de-Fonds (CH)

(73) Assignee: MR Electronics S.A., La Chaux-de-Fonds (CH)

( * ) Notice: Subject to any disclaimer, the term of this patent is extended or adjusted under 35 U.S.C. 154(b) by 0 days.

(21) Appl. No.: 09/412,685

(22) Filed: Oct. 5, 1999

(30) Foreign Application Priority Data

Oct. 5, 1998 (FR) ........................................... 98 12533

(51) Int. Cl.[7] ................................................ H04Q 9/00

(52) U.S. Cl. .................... 340/5.1; 340/5.73; 340/545.6; 340/286.01; 235/382; 713/182

(58) Field of Search ......................... 340/5.1, 5.2, 5.21, 340/5.23, 5.24, 5.25, 5.26, 5.73, 5.7, 545.6, 540, 286.01, 286.02; 235/382; 713/182

(56) References Cited

U.S. PATENT DOCUMENTS 4,723,121 A 2/1988 Van Den Boom et al. ..................... 340/825.31
5,272,650 A 12/1993 Adams et al. ......... 364/571.01
5,488,660 A * 1/1996 Dawson et al. ............. 235/382
6,046,678 A * 4/2000 Wilk ....................... 340/686.1
6,097,306 A * 8/2000 Leon et al. ................ 340/10.1
6,374,653 B1 * 4/2002 Gokcebay et al. ............ 70/224

FOREIGN PATENT DOCUMENTS

DE 0 477 806 A2 12/2000 ........... H02H/11/00
EP 0 215 291 A1 8/1986 ........... E05B/49/00

* cited by examiner

*Primary Examiner*—Nina Tong
(74) *Attorney, Agent, or Firm*—Baker Botts L.L.P.

(57) ABSTRACT

Device for controlling a locking system, of the type including a bolt (18) intended to restrict access to a confined space and comprising an electric power supply, a clock formed of a time base and a counter, to define a time reference, an electronic circuit including a microprocessor and a memory (32); and a key board for entering commands and data, particularly with the purpose of controlling the opening of the bolt. In order to avoid any manipulation of data relating to the intervention dates, the counter includes an incrementation input exclusively connected to the time base. In this way, the information recorded in the counter is only incremented by the time base and cannot be modified by a person.

3 Claims, 1 Drawing Sheet

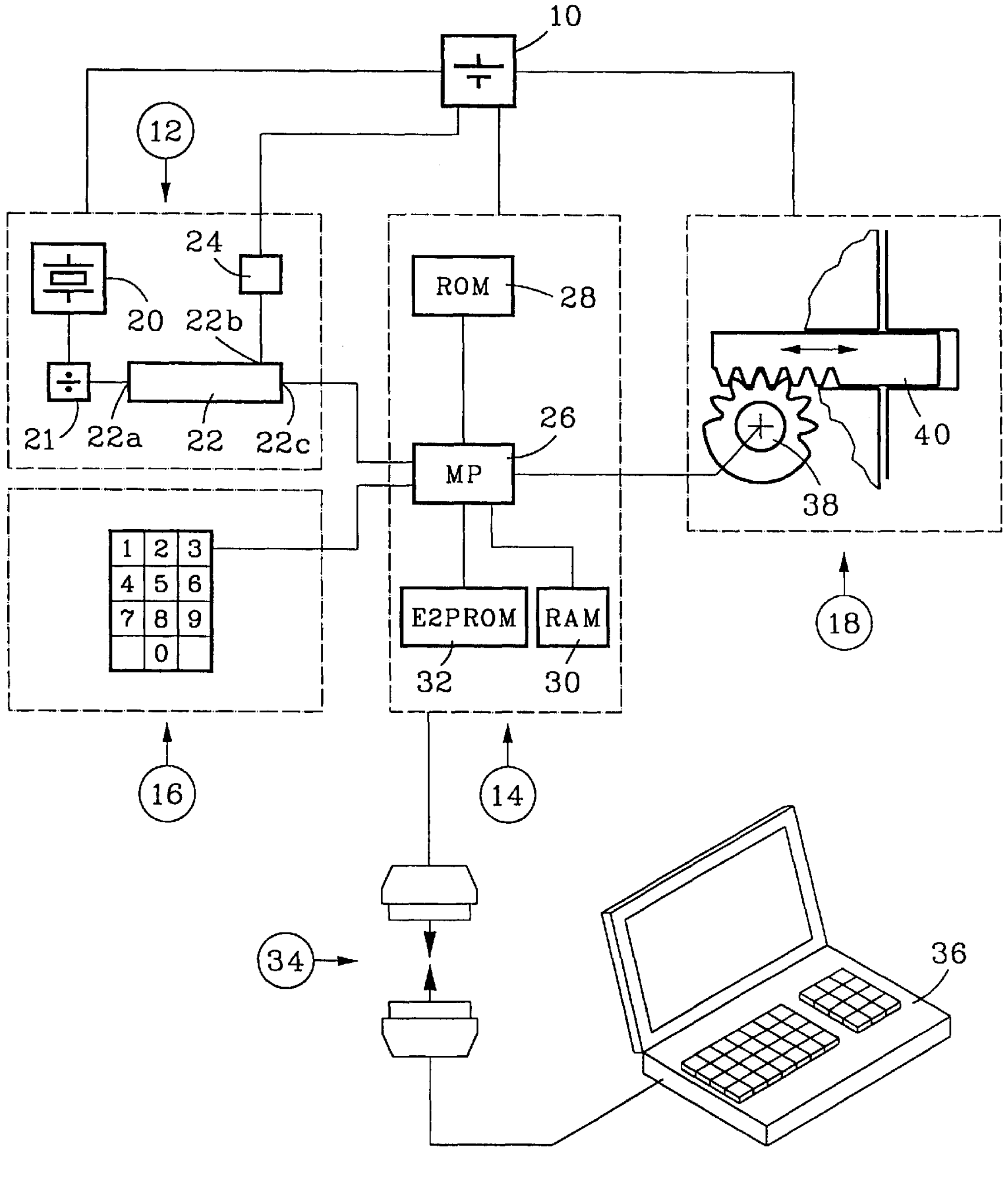
10
12
24
20
22b
21
22a
22
22c
ROM
28
26
MP
E2PROM
RAM
32
30
40
38
18
1 2 3
4 5 6
7 8 9
0
16
14
34
36

DEVICE FOR CONTROLLING A LOCKING SYSTEM FITTED WITH A CLOCK AND METHOD FOR PERFORMING AN AUDIT OF SUCH A LOCKING SYSTEM

BACKGROUND OF THE INVENTION

The present invention relates to devices for controlling locking systems. It concerns more particularly locking systems of the type including a bolt intended to restrict access to a confined space and including:

- an electric power supply,
- a clock, formed of a time base and a counter,
- an electronic circuit including a microprocessor, a memory and connection means, and
- control means, for entering commands and data with a view, in particular, to controlling the opening of the bolt.

Such locking systems are, for example, used for controlling access to cash dispensers. One such system is disclosed in U.S. Pat. No. 5,488,660.

The control means included in this system allow a person who needs to work on or service the dispenser to enter an entry code. The microprocessor processes this code and, when it considers it to be correct, commands or authorizes the opening of the bolt. Thus, persons responsible for loading, maintaining and checking the dispenser can have access thereto in a simple, secure manner.

All of these operations are stored in the memory, with an indication of the date on which they occurred. The date means all useful time related data, namely the minute, the hour, the day, the month and the year of the beginning and if required the end of the operation. An audit is regularly performed by connecting a computer to a connector of the locking system provided for this purpose, and the most recent content of the memory is transferred, starting with the last operation.

It is to be noted that, particularly for economic reasons, the flow of data passes only from the locking system to the computer.

In order for the audit to be fully efficient, it is necessary to know the date of each of the operations which, in order to be certain, must not be able to be modified by any of the persons working on or servicing the dispenser. This is why this correction is only authorized with a specific code. Consequently, a simple operation for changing the locking system battery can lead to the involvement of a senior staff member, which is expensive and out of keeping with the difficulty of the operation.

In the least expensive locking systems, the control means do not include a display. The date setting of the clock thus has to be performed blind. This involves checking operations making handling thereof complex. Moreover, the risk of error cannot be excluded.

Another locking system of this type is disclosed in European Patent No. 0 215 191. It can be controlled by one or more electronic keys, which control a mechanical bolt. The keys and the bolt each include an oscillator, which have to be synchronous. Algorithms, taking account of the content of memories associated with the keys and the bolt, control the opening of the bolt. The manner in which synchronization of the time bases is assured is not described.

SUMMARY OF THE INVENTION

An essential object of the present invention is to provide a locking system fitted with a clock of low cost, which is simple to handle and provides the date in a secure manner.

This object is achieved as a result of the fact that the counter includes an incrementation input exclusively connected to the time base, and an output connected, at least mediately, to the microprocessor and the memory.

With a configuration of this type, the content of the clock counter cannot be modified, except by pulses originating from the time base. In other words, the date which it contains can only have a relative value, since no means exist allowing the content to be altered with respect to the current date. If, at first, this may seem to be a drawback, on further analysis it appears on the contrary, that this solution offers interesting advantages without posing any particular problems.

Indeed, during an audit, the locking system transmits a list of operations with the dates thereof to the portable computer. Since the logic of the system structures the data backwards from the present, the first data item on the list corresponds to the audit currently in progress. The date displayed for this operation can thus be compared by the computer with its internal date, to define a correction offset which will be applied to all the stored data, and so that the exact date of all the operations reported by the audit is known.

When there is an interruption to the power supply, the content of the counter is modified and can take on any value. This does not adversely affect the accuracy of the data contained in the audit if the computer has stored the last coefficient. If this has not been done, it is sufficient for one date to be known with certainty in order to redefine this coefficient, for example for at least one event reported by the previous audit to be repeated in the following audit, or for the exact date of at least one operation performed prior to replacement of the battery to be known.

It is of course already known from European Patent No. 0 477 806 that the accuracy of the oscillator of a microprocessor can be improved by correcting the clock signal by means of an external signal. This microprocessor has no need of the time, requiring only a precise signal giving it its working rhythm.

If the battery is removed with ill intent several times during the audit period, there could be a risk of confusion. In order to overcome this drawback, the device according to the invention further includes an initialization circuit connected to the counter by an initialization input and arranged so that it sets the counter in a pre-defined state when the clock is switched on. Consequently, by analysis of the successive dates concerning the operations reported by the audits, it is easier to define when any ill-intentioned interruptions may have been made to the power supply. It is to be noted that putting the battery in place will, of course, be stored as an operation and, on these grounds, mentioned in the audit.

The clock defined hereinbefore can be fitted with a conventional counter, including portions defining respectively the seconds, minutes, hours, days, months and years. It is also possible to use a decimal or binary counter, since, whatever type the computer may be, it has to perform a mathematical operation to define the date in the current calendar.

The present invention also concerns a method for performing an audit of a locking system as defined hereinbefore. The implementation of this method requires a computer including an internal clock which determines the current date.

This method is characterized in that the following steps are performed:

connection of the computer and entry of the audit command code;

storage, by the computer, of the date of the beginning of the audit related operation as defined by the locking system clock and its own internal clock;

definition by the computer of the correction offset obtained by the difference between the two dates;

application of the offset to each of the dates relating to the events reported during the audit.

By proceeding in this manner, one obtains data which is as complete and accurate as that obtained with the method used until now, but without any correction of the internal date of the locking system having to be performed.

BRIEF DESCRIPTION OF THE DRAWINGS

Other features and advantages of the invention will become clear from the following description, made with reference to the annexed drawing, in which the single FIGURE shows a locking system according to the invention.

DETAILED DESCRIPTION OF THE PREFERRED EMBODIMENT

The locking system shown includes an electric power supply 10, a clock 12, an electronic circuit 14, control means 16 and a bolt 18.

Electric power supply 10 is generally formed by means of one or more alkaline or lithium batteries, available on the market. They are selected so as to be able to assure normal operation for approximately one year.

Clock 12 includes a time base, generally formed of a quartz resonator 20, a frequency divider 21, a counter 22 and an initialization circuit 24. Quartz 20 corresponds to those commonly used in watches. It allows accuracy of the order of one second per day, which is ample for such an application.

Counter 22 may also be of the type used in watches, with a division level up to the year, or possibly the month, or it may work in seconds or minutes, in binary or decimal code. It includes a first incrementation input 22*a*, connected to frequency divider 21, and through it to quartz resonator 20 which generates the pulses which are counted. A second initialization input 22*b*, is connected to initialization circuit 24.

Initialization circuit 24 is connected to battery 10 and arranged so that when it is put into operation, the state of counter 22 is perfectly defined. It will advantageously be equal to zero if the counter relates only to the minutes or seconds, to the first day of the first month, at 0 hours with a conventional time counter.

Electronic circuit 14 includes a microprocessor 26, a ROM type memory 28 containing the programs of microprocessor 26, a RAM type memory 30, intended to store the transitory values and a E2PROM type memory 32, allowing rewritable storage of data which has to kept, even in the event of failure of battery 10. This is the case in particular of data relating to the different operations performed on the locking system which will be subject to audit.

Electronic circuit 14 further includes connection means, formed for example by a connector 34, allowing an external computer represented schematically at 36 and intended to store an audit, to be connected.

Control means 16 are formed of a keyboard allowing commands to be addressed and data to be provided to microprocessor 26, for example the entry of an access code or a command for initializing an audit.

Bolt 18 includes a motor 38, supplied by an electronic power circuit which is not shown in the drawing and is controlled by microprocessor 26, and a rod 40 driven by motor 38.

When an operator interrogates the locking system to obtain an audit, he begins by composing the code giving access to this function and connects computer 36 to connector 34. Microprocessor 26 commands data contained in memory 32 relating to the operations performed on the locking system to be sent, starting with the most recent. Each train of data relating to an operation includes the date of the operation in the scale of locking system clock 12, the type of operation and a code allowing the person having performed the operation to be identified.

The operation currently being performed is transmitted first. As it knows the current date, the computer can thus calculate a correction offset which, added to the date stored in the locking system, gives the current date for each of the operations undertaken.

By defining this offset each time that an audit is performed, the drift of the locking system's internal time base is automatically corrected, to the extent, of course, that the computer clock time is accurate.

If the offset is kept in the computer, it is possible to check that there has been no interruption to the power supply of the clock. It is also possible to determine the working of the locking system's internal clock. Thus, as a result of the features, on the one hand of the locking system, and on the other hand of the method for recording audits defined hereinbefore, it is possible to reduce the operations performed on the locking system, without thereby affecting security of access.

What is claimed is:

1. Device for controlling a locking system, of the type including a bolt intended to restrict access to a confined space and including:

an electric power supply, a clock, formed of a time base and a counter, wherein the counter comprises an incrementation input connected to the time base to be incremented and an output, control means, for entering commands and data, particularly with the purpose of controlling the opening of the bolt, and an electronic circuit including a microprocessor connected to the output of the clock and to the control means from which it obtains orders and information, and a memory wherein are recorded programs to drive the microprocessor and to record information regarding the functioning of the device, wherein the incrementation input is exclusively connected to the time base in such a way that the state of the counter is only incremented by the time base, and a computer including an internal clock in which the current date is defined, and arranged:

to be connected to the microprocessor, to send the audit command code to the microprocessor, to record the dates of said memory and of said internal clock, to define a correction offset obtained by the difference between the two dates, and to apply the offset to each of the dates relating to the events reported during the audit.

2. Device according to claim 1, wherein said clock further includes an initialization circuit, connected to said counter, by an initialization input, and to the electric power supply, said initialization circuit being arranged so that it sets the counter in a pre-defined state when the clock is switched on.

3. Device according to claim 2, wherein said counter performs the counting operations on a single time unit.

* * * * *